United States Patent
Kim et al.

(10) Patent No.: US 6,318,076 B1
(45) Date of Patent: Nov. 20, 2001

(54) APPARATUS FOR TREATING THE EXHAUST GAS OF AN INTERNAL COMBUSTION ENGINE

(75) Inventors: In Tak Kim, Sungnam; Cha Ri Myung; Yong Sub Kim, both of Kyungki-do, all of (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/473,572

(22) Filed: Dec. 28, 1999

(30) Foreign Application Priority Data

Jul. 15, 1999 (KR) .................................................. 99-28742

(51) Int. Cl.[7] ...................................................... F01H 3/10
(52) U.S. Cl. ............................... 60/300; 60/299; 60/298; 60/303; 60/284
(58) Field of Search ............................. 60/300, 303, 286, 60/284, 324, 274, 298; 123/41.08, 41.09, 41.1, 142.5 R

(56) References Cited

U.S. PATENT DOCUMENTS

| | | | |
|---|---|---|---|
| 3,851,629 | * | 12/1974 | Mayr et al. ....................... 123/41.08 |
| 4,370,950 | * | 2/1983 | Furukubo .......................... 123/41.08 |
| 4,605,164 | * | 8/1986 | Hayashi et al. ....................... 237/2 A |
| 5,233,831 | * | 8/1993 | Hitomi et al. .......................... 60/288 |
| 5,410,875 | * | 5/1995 | Tanaka et al. .......................... 60/288 |
| 5,538,697 | * | 7/1996 | Abe et al. ............................. 422/171 |
| 5,979,157 | * | 11/1999 | Kungasa et al. ....................... 60/274 |
| 6,029,441 | * | 2/2000 | Mizuno et al. ......................... 60/274 |
| 6,112,520 | * | 9/2000 | Kaiho et al. ........................... 60/303 |

* cited by examiner

Primary Examiner—Thomas Denion
Assistant Examiner—Binh Tran
(74) Attorney, Agent, or Firm—Christie, Parker & Hale, LLP

(57) ABSTRACT

An apparatus for treating the exhaust gas of internal combustion engine comprises an injector, a valve for shutting off the cooling water which flows into a cylinder head, an exhaust manifold increasing the fluidity of the exhaust gas, a close-coupled catalyst (CCC) increasing the activation of a catalyst with high loading operation in case of low temperate, an HC-absorber catalyst including an HC absorber and a TWC catalyst component for removing the HC component in the exhaust gas, and a electrically heated catalyst and a light off catalyst for removing the HC component at high temperate.

15 Claims, 4 Drawing Sheets

APPARATUS FOR TREATING THE EXHAUST GAS OF AN INTERNAL COMBUSTION ENGINE

FIELD OF THE INVENTION

The present invention relates to an apparatus for treating the exhaust gas of an internal combustion engine, more particularly an apparatus for treating the exhaust gas of an inter combustion engine, which is capable of purifying the exhaust gas efficiently.

BACKGROUND OF THE INVENTION

One of the evil effects attendants upon the development of the technology and the industry is an environmental pollution. The kind and the reasons of the environmental pollution are much and complicated.

Air pollution, water pollution and noise pollution become the social problems seriously. Then the air pollution mainly depends upon the exhaust gas of the automobile and the exhaust gas causes the headache, the cough and the health trouble.

The exhaust gas is classified into three classes that the exhaust gas from the internal combustion engine, the blow-by gas from the crankcase of the engine and the evaporation gas evaporated in a fuel tank and a carburetor.

The exhaust gas from the combustion engine is a gas exhausted from the engine after igniting the mixed fuel with air. The component of the exhaust gas from the engine includes not only a water vapor, a nitrogen and a carbonic acid gas that inoffensive to the person but also CO, hydrocarbon, nitric oxide, carbon grains and a lead oxide etc that offensive to the person.

Many study have been progressed to remove the harmful material included in the exhaust gas from the combustion engine and discharge the purified gas that is not harmful to the person from long ago.

FIG. 2 shows an apparatus for treating the exhaust gas of an internal combustion engine that is a super ultra low environmental pollution (SULEV) engine made by the HONDA Company of Japan. The apparatus includes an exhaust manifold 30 made with stainless steel having a low thermal conductivity. A catalyst 32 is connected with the exhaust manifold 30, and a hybrid catalyst 61 and a electrically heated catalyst (EHC) 60 are serially connected to the catalyst 32

FIG. 1 shows an apparatus for treating the exhaust gas of an internal combustion engine that is a super ultra low environmental pollution (SULEV) engine made by the NISSAN Company of Japan. The apparatus includes an EHC 60 and a under floor TWC 62. The exhaust gas is discharged into the atmosphere through the EHC 60 and the under floor three-way catalyst or three-way catalytic converter (TWC) 62 in turn and purified. An HC-absorber 50 is connected to the rear end of the TWC 62 through the bypass line 51.

The after treatment device of the exhaust gas according to HONDA uses a catalyst having high density of 1200 cells per square inch having a low efficiency. Therefore, the after treatment device of the exhaust gas according to HONDA is of no practical use.

Furthermore, the after treatment device of the exhaust gas according to NISSAN needs two valves for controlling the large EHC 60 and the under floor TWC 62, and sometimes the valves are worked wrong. Therefore the exhaust gas is not properly purified.

SUMMARY OF THE INVENTION

The object of the present invention is to provide an apparatus for treating the exhaust gas of an internal combustion engine that is capable of purifying the exhaust gas efficiently and is simple in its construction.

The present invention achieves the above object by comprising an injector atomizing the fuel, a valve for shutting off the cooling water which flows into a cylinder head, an exhaust manifold increasing the fluidity of the exhaust gas, a close-coupled catalyst (CCC) increasing the activation of a catalyst during high loading operation of the engine at low temperatures, an Hydrocarbon absorber (HC-absorber) catalyst including an HC absorber and a TWC catalyst component for removing the HC component in the exhaust gas, and an electrically heated catalyst and a light off catalyst for removing the HC component at high temperatures.

The CC catalyst is comprised of 400 cells per square inch and the rear end of the EHC has a valve for controlling the back pressure to increase the absorbing efficiency of the catalyst, during initial operation of the engine.

The CC catalyst is comprised of 400 cells and the rear end of the EHC has a valve for controlling the back pressure to increase the absorbing efficiency of the catalyst, when the engine is begin to drive.

BRIEF DESCRIPTION OF THE DRAWINGS

The above object and other advantages of the present invention will become more apparent by describing in detail the preferred embodiment of the present invention with reference to the attached drawings in which:

FIG. 6 is graphs showing the output of the oxygen sensor in case of heat-on.

DETAILED DESCRIPTION

Figure 1:
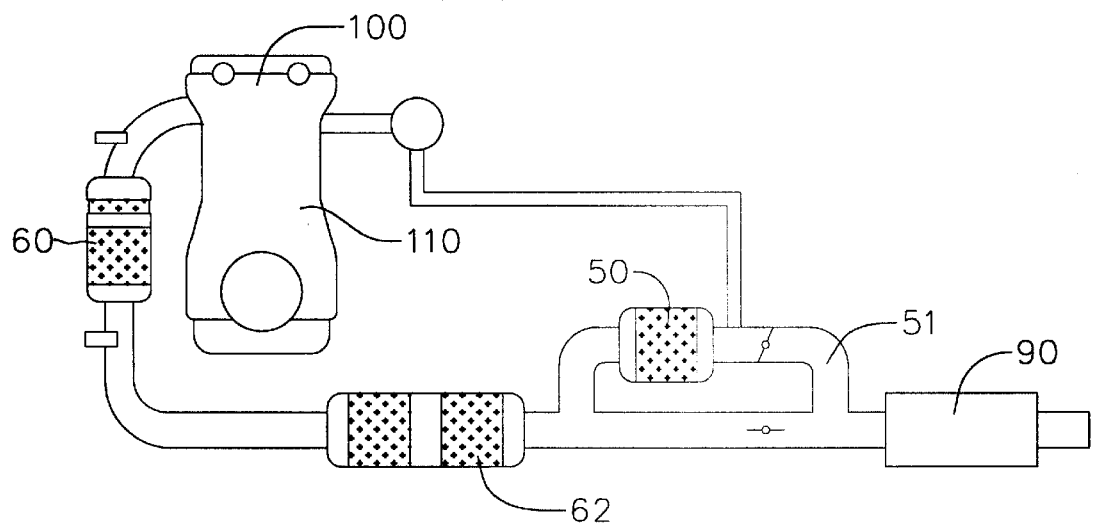
FIG. 1 is a schematic diagram of a prior apparatus for treating the exhaust gas of an internal combustion engine.
Figure 2:
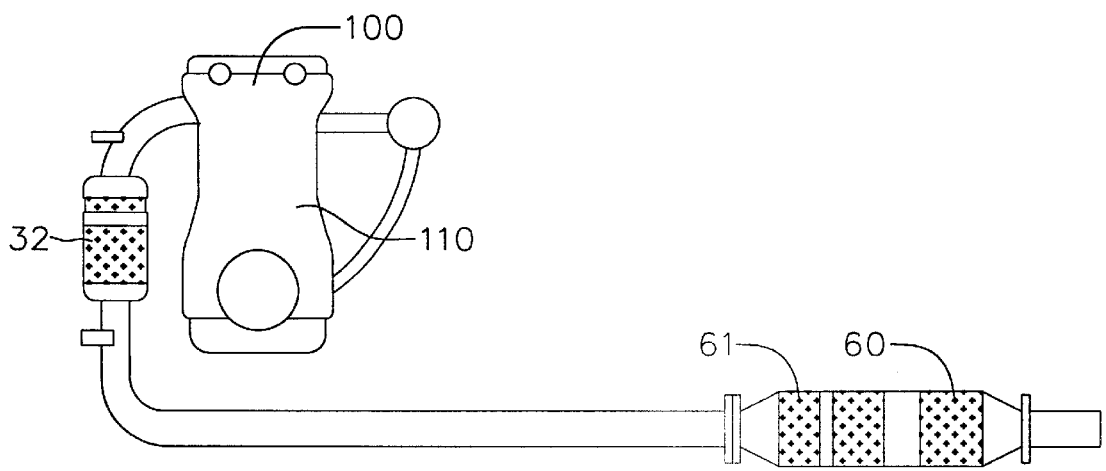
FIG. 2 is another schematic diagram of a prior apparatus for treating the exhaust gas of an internal combustion engine.
Figure 3:
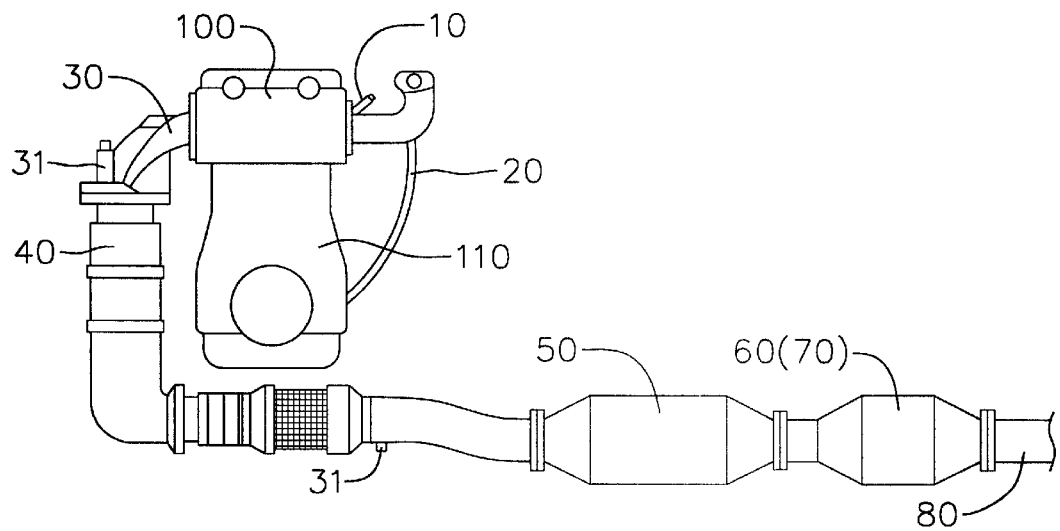
FIG. 3 is a a schematic diagram of an apparatus for treating the exhaust gas of an internal combustion engine in accordance with the present invention.

An apparatus in accordance with the present invention comprises an injector 10 atomizing the fuel, a valve 20 for shutting off the cooling water which flows into a cylinder head 100 and a cylinder block 110, an exhaust manifold 30 increasing the fluidity of the exhaust gas, a close-coupled catalyst (CCC) increasing the activation of a catalyst during high loading operation at low temperatures, an Hydrocarbon-absorber catalyst 50 including an HC absorber and a TWC catalyst component for removing the HC component in the exhaust gas, and a electrically heated catalyst 60 and a light off catalyst 70 for removing the HC component at high temperatures.

The injector 10 has a good atomization characteristic and the valve 20 shuts off the cooling water supply to a water jacket in the cylinder block 110 and the cylinder head 100 in order to increase the atomization degree of the fuel and the combustion efficiency of the fuel.

One end of the exhaust manifold 30 connected to the cylinder head 100 is designed to have a hemi-cyclical shape to increase the fluidity of the fuel in order that the exhaust gas flows through the catalyst and purified clearly.

The valve 20 is mounted between a thermostat housing and a water pump and receives the output signal from the thermal sensor sensing the temperate of the cooling water to shuts off the flow of the cooling water supplying into the water jacket of the cylinder head 100 and the cylinder block 110, when the engine is started in cooling state and the engine is not warmed enough.

The result of the shutting off the cooling water, the temperate of the cylinder head 100 and the combustion chamber of the engine is highly increased.

As the result of that, the fuel mixture unburned is not condensed and is not piled up on the quenching area of the combustion chamber of the engine.

A sensor 31 is provided on the other end of the exhausted manifold 30 and the rear end of the CC catalyst 40 to sense the amount of the oxygen contained in the exhausted gas. A fast light off sensor may be used as the sensor 31.

The exhausted gas get out from the exhaust manifold 30 passes through the CC catalyst 40 to remove the FIC contained in the exhausted gas. The CC catalyst 40 may be a D50 or D100 that is a kind of a Pd series.

The CC catalyst 40 of the Pd series is activated very well, even though when the engine is a high loading state and the driving temperature of the engine is low The HC-absorber catalyst 50 removes the remained HC in the exhaust gas getting out from the CC catalyst 40.

It is preferred that The HC-absorber catalyst 50 is comprised of an HC-absorber removing the HC efficiently and a TWC catalyst increasing the efficiency of the purification for the HC and the $NO_x$.

When the temperature of the exhaust gas is increased, the HC is separated from the HC-absorber catalyst 50 and discharged from the HC-absorber catalyst 50. In order to remove the HC and the $NO_x$, the EHC 60 and the fast light off catalyst 70 are provided.

In the preferred embodiment of the present invention, the HC-absorber catalyst 50 should be mounted on a position at which the temperature is relatively lower in order to prevent the easy separation of the HC from the HC-absorber catalyst 50, because the HC is easily separated from the catalyst 50 when the temperature is high.

A valve 80 for controlling the back pressure of the exhaust gas in the exhaust gas pipe is provided on the rear end of the EHC to increase the efficiency of the catalyst, when the engine begin to drive or is driven in the coldest season.

The valve 80 increases the purifying efficiency of the catalyst and decreases $NO_x$ by controlling the backpressure and the temperature of the exhaust gas in the exhaust gas pipe.

The result of the test using the after treatment of the exhaust gas in accordance with the present invention and the kind of the catalysts are shown in the following table 1 and table 2.

TABLE 1

| | CCC | | HC-Absorber | | | EHC | |
|---|---|---|---|---|---|---|---|
| Define | 1st | 2nd | 1st | 2nd | 3rd | 1st | 2nd |
| Thickness of the wall (mm) | 6.5 | ← | ← | ← | ← | 4.0 | ← |
| Density of the cell (cpsi)) | 400 | ← | ← | ← | ← | 450 | 600 |
| Shape of the cell | Square | ← | ← | ← | ← | Hexagonal | Square |
| Diameter (mm) | Ø80 × 125 | ← | 110 | ← | ← | Ø75 | Ø91.5 |
| Length (mm) | 52 | 76 | 47.5 | 52.6 | 106 | 7.8 | 91.2 |
| Electric Resistance (m-Ω) | — | — | — | — | — | 100 | — |
| Loading (g/l) | Pd 10.0 | Pd 5.0 | 5 Pd/Rh 3.0 | — | — | Pd 4.24 | ← |
| Volume (l) | 0.4 | 0.6 | 0.45/0.9 | 0.5/1.0 | 1.0/— | 0.03 | 0.6 |
| Total Volume (l) | | 1.0 | | 1.95/1.9 | | | 0.603 |

TABLE 2

| Automobile and exhaust system | THC/NMHC | CO | $NO_x$ |
|---|---|---|---|
| Restriction value of the SULEV (120K) | 0.010 (NMOG) | 1.0 | 0.02 |
| Honda ZLEV (100K) | <0.004 (NMOG) | <0.17 | <0.02 |
| RD LEV | 0.0272/0.0259 | 0.0286 | 0.0147 |
| LEV exhaust manifold (FCD-H) + CCC + HC absorber (1.5 l) | 0.0184/0.0166 32% ↓ | 0.0435 | 0.0083 |
| Improved exhaust manifold (SUS) + ULEV system + HC absorber | 0.0112/0.0104 59% ↓ | 0.0218 | 0.0186 |
| ↑ + EHC | 0.0068/0.0062 75% ↓ | 0.0207 | 0.0124 |
| ↑ + cooler and back pressure control system | 0.0045/0.0041 80% ↓ | 0.0124 | 0.0166 |
| ↑ + (W/O Shift/Pattern) | 0.0045/0.0041 83% ↓ | 0.0041 | 0.0145 |

Re) ULEV System: EV6 fuel injector, EV6 + CCC + LSF, 4.7 + Shaft/Pattern, change TCU + catalyst heated.

Herewith, the above test is carried out with the RV LEV as the base. Under the condition of that, the value of the NMHC is 0.0041 g/mill. This valve is corresponded to the 41% of the 0.010 NMOG (Non-Methane Organic-Gases) that is the restricted value in the NMOG of SULV. The amount of the exhaust gas satisfies the limit restricted. The discharge characteristic of TWC is shown in FIG. 4.

Figure 4:
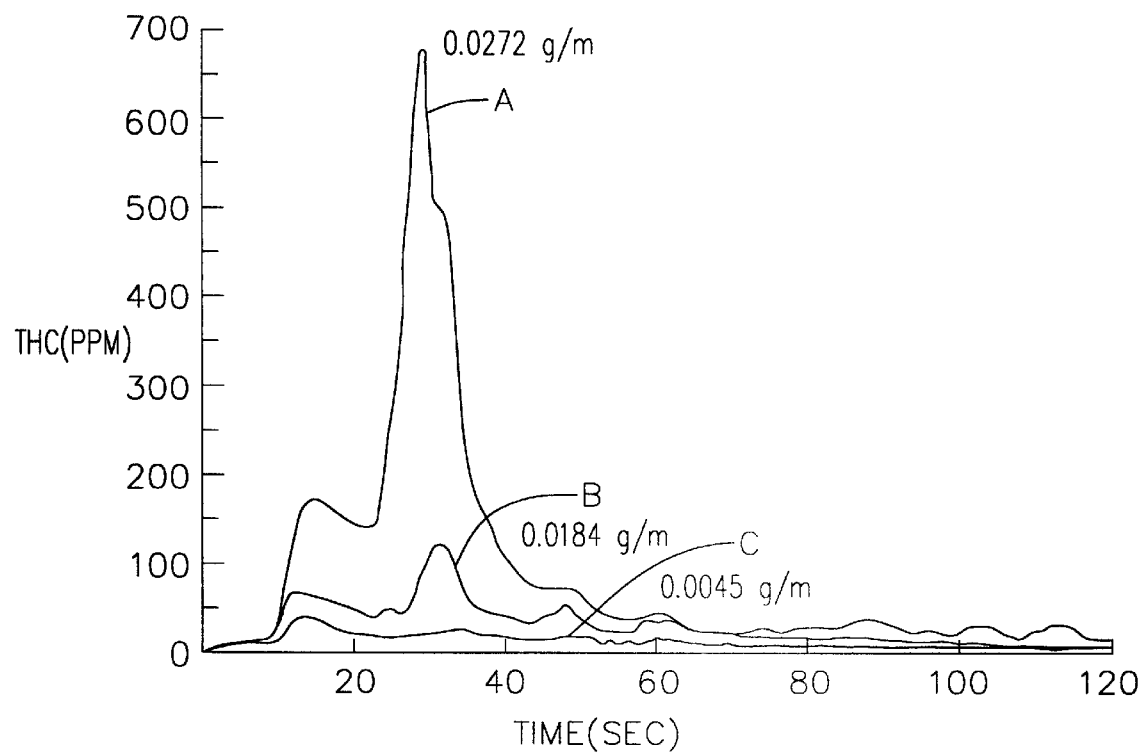
FIG. 4 is a graph showing the exhaust characteristic of the TWC in the apparatus according to the present invention.

In FIG. 4, the graph A shows the result of test that only the LEV is used, the graph B shows the result of test that the exhaust manifold and the HC-absorber mounted on the LEV are used, the graph C shows the result of test that a EHC is added to the exhaust manifold improved the fluidity of the exhaust gas, the ULEV system and the HC-absorber.

The time for discharging the exhaust gas and the temperature of surface of the CC catalyst in case that the LEV and the manifold according to the present invention are measured under P1 (FTP-75) are shown in the table 3 and table 4 respectively.

TABLE 3

|     | LEV    | Present invention |            |
|-----|--------|-------------------|------------|
|     | FCD-H  | FCD-H             | SUS (Pipe) |
| THC | 0.0272 | 0.022 (19% ↓)     | 0.018 (34% ↓) |

TABLE 4

|               |            | Exhaust gas | Center of CCC | Left of CCC | Right of CCC |
|---------------|------------|-------------|---------------|-------------|--------------|
| LEV           | FCD-H      | 24          | 39            | 39          | 39           |
| Present       | FCD-H      | 22 (2↓)     | 35 (5↓)       | 38 (1↓)     | 37 (2↓)      |
| invention     | SUS (Pipe) | 17 (7↓)     | 33 (6↓)       | 32 (7↓)     | 32 (7↓)      |

In table 4, the time indicates hours that the temperature of the exhaust gas and the CCC-bed reaches to the temperature at which the catalyst activates.

About the temperature of the exhaust gas and the temperature at the center portion of the CCC catalyst, the temperature of the SUS in accordance with the present invention is higher than that of the LEV.

To the activating temperature of the catalyst (L.O.T.), 5 seconds are shortened in the FCD-H and 6 seconds is shortened in Stainless Steel Material (SUS). And to the L.O.T. at the both sides of the catalyst, 2 seconds is shortened in Ferrite Cast Iron Ductile-Hot (FCD-H) and 7 seconds is shortened in the SUS. At the above, the L.O.T. indicates that the temperature of the center portion of the carrier when the purifying efficiency of catalyst reaches to the 50% of the maximum.

Therefore, generally the L.O.T. means the activating temperature of the catalyst.

The reasons for shortening the time that the temperature of the exhaust gas and the temperature of the CCC catalyst reach to the activating temperature of the catalyst are as follows:

first, the fluidity of the exhaust gas is improved at the connecting portion of the exhaust pipe and the front face of the carrier.

Second, the length of the exhaust manifold runner is reduced about 5–15%.

Third, the thermal inertia of the exhaust manifold is reduced, because the weight of the exhaust manifold by changing the material of the exhaust manifold is decreased.

The table 5 shows that the amount of the exhaust gas in the internal combustion engine is changed by varying the volume of the HC-absorber in P1 (FTP-75).

TABLE 5

| TWC and HC-absorber | THC | CO | NO$_x$ | Re |
|---|---|---|---|---|
| TWC 0.9 l and HC-absorber 1.0 l | 0.0064 | 0.0248 | 0.0083 | |
| TWC 0.45 l and HC-absorber 1.5 l | 0.0045 (30% ↓) | 0.0041 (83% ↓) | 0.0145 (75% ↑) | ↑ |
| TWC 0.9 l and HC-absorber 0.92 l | 0.0049 | 0.0145 | 0.0062 | |
| TWC 0.45 l and HC-absorber 1.38 l | 0.0048 (2% ↓) | 0.0062 (57% ↓) | 0.0083 (34% ↑) | ↑ |

As shown in table 5, as the volume of the HC-absorber is increased, the amount of the THC and the CO is decreased. This is caused that the trapping efficiency of the HC-absorber is increased. And as the volume of the TWC is decreased, the amount of the NO$_x$ is increased.

Herewith, the HC-absorber is composed of a zeolite construction. The HC-absorber absorbs the HC-component at the temperature under 200° C. that is cooling state, and slowly discharge the HC-component when the temperature is increased from the above temperature.

To remove the HC component effectively, it is preferred that the HC-absorber combined with a ternary catalyst component is used.

Figure 5:
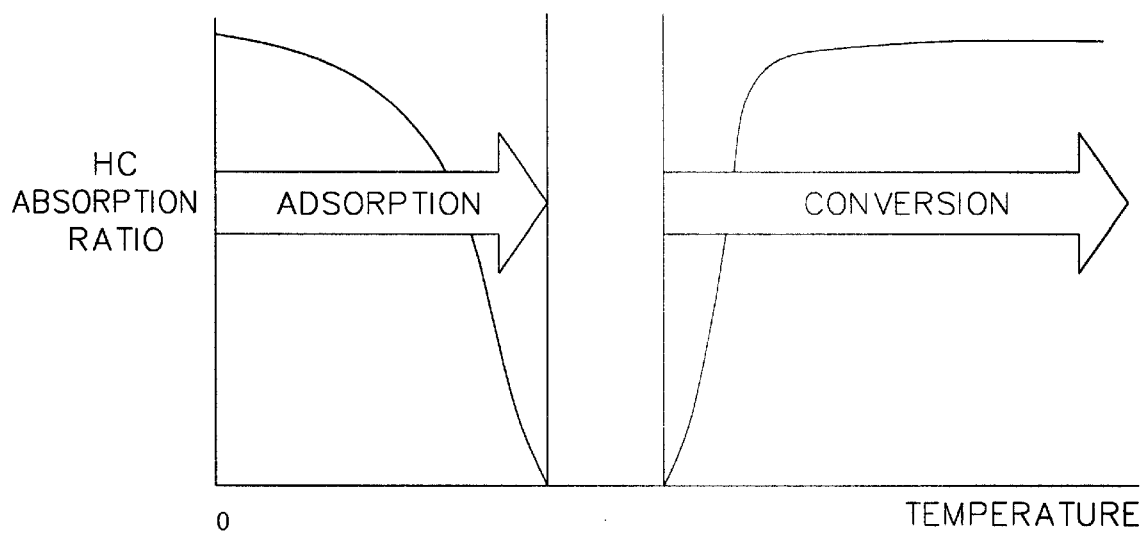
FIG. 5 is a graph showing the operating principle of the hybrid catalyst system used in the present invention, which is a catalyst system that an HC-absorber is combined with a TWC.

FIG. 5 is a graph showing the operating principle of the hybrid catalyst system used in the present invention, which is a catalyst system that the HC-absorber is combined with the TWC, As shown in FIG. 5, when engine is begin to drive or drives under the activating temperature of catalyst, the HC component is absorbed by the HC-absorber. And then, when the temperature of the catalyst reaches to the limit of temperature for activating the catalyst, the HC component is separated and discharged. The discharged HC component is removed by the EHC in accordance with the present invention.

The amount of the components contained in the exhaust gas is differently tested as shown in the table 6 according to the kind of the oxygen sensor used in the present invention.

TABLE 6

| | O₂ Sensor | | | | |
|---|---|---|---|---|---|
| Model | Heater Power | Open loop time | THC | CO | NO$_x$ |
| Prior (LSH 25) | 18 watt | 27 s | 0.0153 | 0.0176 | 0.0228 |
| Fast light off (LSF 4.7) | 7 watt | 7 s | 0.0151 (1% ↓) | 0.0145 (1% ↓) | 0.0207 (1% ↓) |

Figure 6:
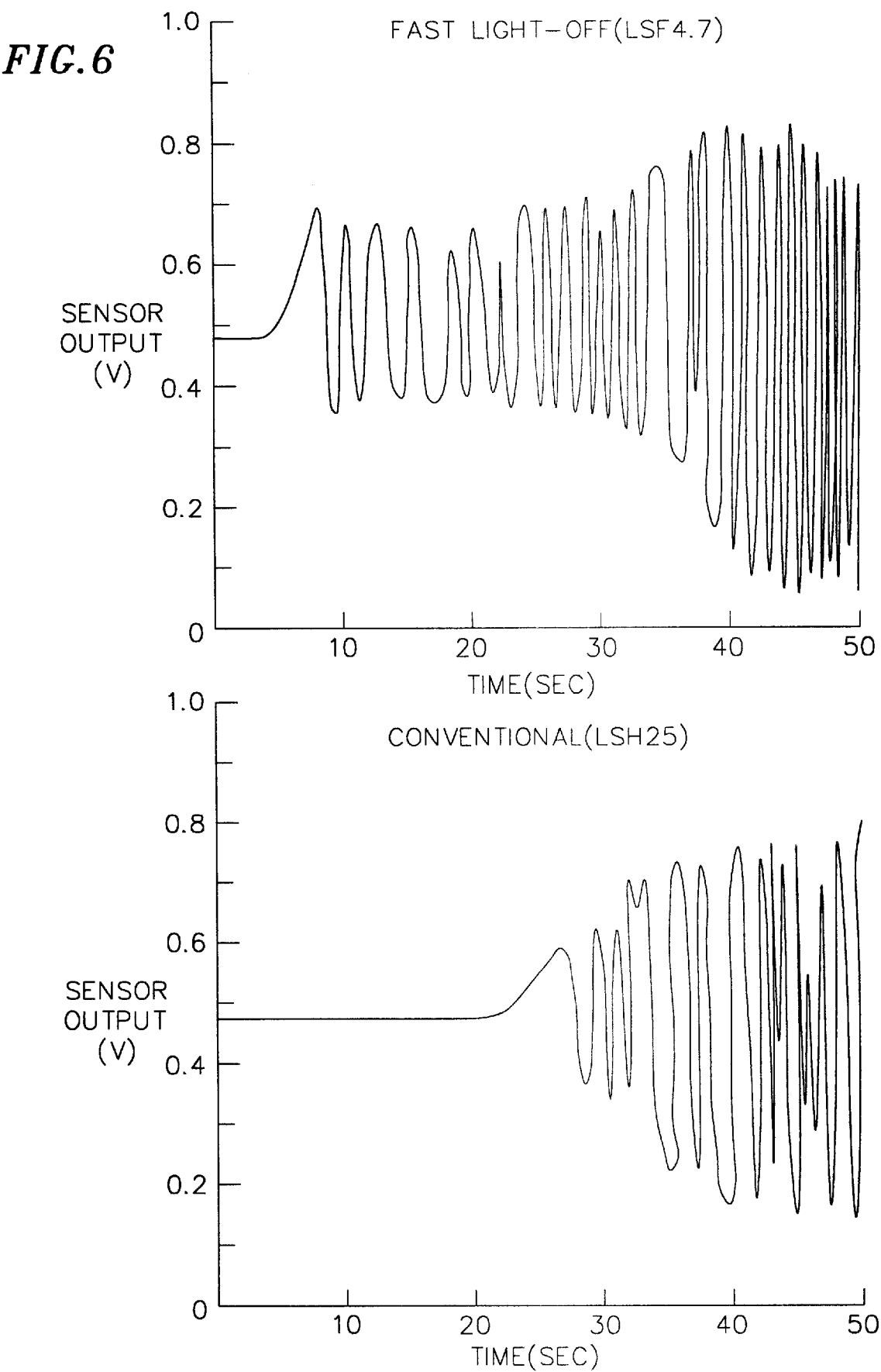

FIG. 6 is graphs showing the output signal of the oxygen sensor in case of heat-on. From the graphs, we can recognize followings; when the LSF 4.7 of which the loop open time is 7 seconds is adopted, the 1% of THC, 18% of CO and 9% of NO$_x$ are reduced in comparison with the case that the LSH 25 of which the loop open time is 27 seconds is adopted.

What is claimed is:

1. An apparatus for treating the exhaust gas of internal combustion engine comprising:

an injector;

a valve for shutting off the cooling water which flows into a cylinder head;

an exhaust manifold increasing the fluidity of the exhaust gas, a close-coupled catalyst for increasing the activation of a catalyst during high loading operation in case of low temperature;

an HC-absorber catalyst including an HC absorber and a TWC catalyst component for removing the HC component in the exhaust gas; and an electrically heated catalyst and a light off catalyst for removing the HC component at high temperature, said electrically heated catalyst being located downstream of the HC-absorber catalyst.

2. An apparatus for treating the exhaust gas of internal combustion engine according to claim 1, wherein the one end of the exhaust manifold is designed to have a hemicyclical shape to increase the fluidity of the fuel in order that the exhaust gas is not biased to one side of the catalyst when the exhaust gas flows through the CC catalyst and is purified clearly.

3. An apparatus for treating the exhaust gas of internal combustion engine according to claim 1, wherein the CC catalyst is comprised of 400 cells per square inch.

4. An apparatus for treating the exhaust gas of internal combustion engine according to claim 1, wherein the electronically heated catalyst has a valve for controlling a back pressure to increase the absorbing efficiency of the catalyst, during initial engine operation.

5. An apparatus for treating the exhaust gases of an internal combustion engine, the apparatus comprising:

a valve for controlling cooling water which flows into a cylinder head of the internal combustion engine;

an exhaust manifold for coupling to the engine and for receiving exhaust gases from said engine;

a close-coupled catalyst coupled to the exhaust manifold for receiving the exhaust gases and for increasing the activation of a catalyst during high loading operation of the engine at low temperatures below normal engine operating temperature;

an hydrocarbon catalyst coupled to the exhaust manifold for receiving and treating the exhaust gases, the hydrocarbon catalyst comprising an hydrocarbon absorber and a three-way catalytic converter; and a heated catalyst and a light off catalyst coupled to the exhaust manifold for removing hydrocarbon components from the exhaust gases at high temperature, wherein the heated catalyst is coupled to the exhaust manifold downstream from the hydrocarbon catalyst for receiving exhaust gases treated by the hydrocarbon catalyst.

6. An apparatus as recited in claim 5 wherein the close-coupled catalyst comprises 400 cells per square inch.

7. An apparatus as recited in claim 5, wherein the heated catalyst, is an electrically heated catalyst.

8. An apparatus as recited in claim 5 wherein the heated catalyst comprises a valve for controlling a back pressure of the exhaust gases.

9. A method for treating exhaust gases of an internal combustion engine comprising the steps of:

controlling the temperature of an engine cylinder head by controlling the flow of water to the cylinder head;

treating exhaust gases in a close-coupled catalyst;

receiving exhaust gases from the close-coupled catalyst in a hydrocarbon catalyst;

treating the exhaust gases received in the hydrocarbon catalyst with an hydrocarbon absorber and a three-way catalytic converter;

heating a catalyst; and receiving treated exhaust gases from the hydrocarbon catalyst in the heated catalyst.

10. A method as recited in claim 9 wherein the step of treating exhaust gases in the close-coupled catalyst comprises the step of treating the exhaust gases when the engine is operated at high loading conditions and the engine temperature is below normal operating temperatures.

11. A method as recited in claim 10 further comprising the step of controlling a back pressure generated by the exhaust gases.

12. A method as recited in claim 11 wherein the step of controlling back pressure comprises controlling a valve coupled to the heated catalyst.

13. A method as recited in claim 9 further comprising the step of heating the catalyst comprises electrically heating the catalyst.

14. A method as recited in claim 9 wherein the step of treating exhaust gases in a close-coupled catalyst comprises treating exhaust gases in a close-coupled catalyst comprising 400 cells per inch.

15. A method as recited in claim 9 further comprising the step of treating the exhaust gases at a light-off catalyst for removing a hydrocarbon component from the exhaust gases when the engine is operating at temperatures above normal operating temperatures.

* * * * *